United States Patent
Takahashi (10) Patent No.: US 7,986,835 B2
(45) Date of Patent: Jul. 26, 2011

(54) COLOR PROCESSING APPARATUS AND METHOD FOR PERFORMING COLOR CORRECTION ACCORDING TO COLOR STABILIZATION ACCURACY OF AN IMAGE OUTPUT DEVICE

(75) Inventor: Kosei Takahashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 956 days.

(21) Appl. No.: 11/871,805

(22) Filed: Oct. 12, 2007

(65) Prior Publication Data
US 2008/0144928 A1    Jun. 19, 2008

(30) Foreign Application Priority Data

Dec. 19, 2006    (JP) .................................. 2006-341398

(51) Int. Cl.
*G06K 9/00* (2006.01)
*G03F 3/08* (2006.01)

(52) U.S. Cl. ........................................ 382/167; 382/166

(58) Field of Classification Search .................. 382/162, 382/164, 166, 167, 254; 358/1.9, 2.1, 3.29, 358/504, 515, 518; 348/208.99; 345/581, 345/589, 600–604
See application file for complete search history.

(56) References Cited

U.S. PATENT DOCUMENTS

| | | | | |
|---|---|---|---|---|
| 5,481,380 | A * | 1/1996 | Bestmann | 358/504 |
| 5,497,180 | A * | 3/1996 | Kawakami et al. | 347/131 |
| 5,636,290 | A * | 6/1997 | Kita et al. | 382/167 |
| 6,181,356 | B1 * | 1/2001 | Ohnishi et al. | 347/116 |
| 7,268,913 | B2 * | 9/2007 | Murashita | 358/1.9 |
| 7,728,847 | B2 * | 6/2010 | Koyama | 345/601 |
| 2002/0122209 | A1 * | 9/2002 | Yoshida | 358/2.1 |
| 2003/0107772 | A1 * | 6/2003 | Shimazaki et al. | 358/3.29 |
| 2007/0236578 | A1 * | 10/2007 | Nagaraj et al. | 348/208.99 |
| 2008/0144928 | A1 * | 6/2008 | Takahashi | 382/162 |
| 2010/0149567 | A1 * | 6/2010 | Kanazawa et al. | 358/1.9 |

FOREIGN PATENT DOCUMENTS

| | | |
|---|---|---|
| JP | 2003-283846 A | 10/2003 |
| JP | 2005-318478 A | 11/2005 |

* cited by examiner

*Primary Examiner* — Amir Alavi
(74) *Attorney, Agent, or Firm* — Canon U.S.A. Inc., I.P. Division (57) ABSTRACT

A color processing apparatus includes an acquiring unit configured to acquire color conversion data corresponding to an image output device, a color stabilization accuracy calculating unit configured to calculate a color stabilization accuracy of the image output device, and a correcting unit configured to correct the color conversion data according to the color stabilization accuracy. The correcting unit is configured to correct the color conversion data such that an output color saturation in a low color saturation region becomes lower when the color stabilization accuracy is low than when the color stabilization accuracy is high.

6 Claims, 10 Drawing Sheets

COLOR PROCESSING APPARATUS AND METHOD FOR PERFORMING COLOR CORRECTION ACCORDING TO COLOR STABILIZATION ACCURACY OF AN IMAGE OUTPUT DEVICE

BACKGROUND OF THE INVENTION

1. Field of the Invention

The present invention relates to a color processing apparatus configured to perform color correction according to color stabilization accuracy of an image output device.

2. Description of the Related Art

In performing color matching between different devices (e.g., a monitor and a printer), a conventional system uses the following formula (1) to obtain XYZ tri-stimulus values of illuminant colors (e.g., monitor colors) and uses the following formula (2) to obtain XYZ tri-stimulus values of object colors (e.g., printed product colors). Furthermore, the conventional system uses the following formula (3) to obtain CIELab values (hereinafter referred to as "Lab values") from the XYZ tri-stimulus values, as color values in a device-independent color space. Then, the system performs color reproduction such that an input image matches an output image in Lab values.

$$X = k \int_{vis} P(\lambda) \cdot \bar{x}(\lambda) \cdot d\lambda$$

$$Y = k \int_{vis} P(\lambda) \cdot \bar{y}(\lambda) \cdot d\lambda$$

$$Z = k \int_{vis} P(\lambda) \cdot \bar{z}(\lambda) \cdot d\lambda$$

$$k = 683.0 \qquad (1)$$

In formula (1), $P(\lambda)$ represents a spectral radiance of illuminant color, and $\bar{x}(\lambda)$, $\bar{y}(\lambda)$, and $\bar{z}(\lambda)$ represent color matching functions.

$$X = k \int_{vis} R(\lambda) \cdot P(\lambda) \cdot \bar{x}(\lambda) \cdot d\lambda \qquad (2)$$

$$Y = k \int_{vis} R(\lambda) \cdot P(\lambda) \cdot \bar{y}(\lambda) \cdot d\lambda$$

$$Z = k \int_{vis} R(\lambda) \cdot P(\lambda) \cdot \bar{z}(\lambda) \cdot d\lambda$$

$$k = \frac{100}{\int_{vis} P(\lambda) \cdot \bar{y}(\lambda) \cdot d\lambda}$$

In formula (2), $R(\lambda)$ represents a spectral reflectance of object color, $P(\lambda)$ represents a spectral radiance of illuminant color, and $\bar{x}(\lambda)$, $\bar{y}(\lambda)$, and $\bar{z}(\lambda)$ represent color matching functions.

$$L^* = 116 * f\left(\frac{Y}{Y_n}\right) - 16 \qquad (3)$$

$$a^* = 500 * \left\{ f\left(\frac{X}{X_n}\right) - f\left(\frac{Y}{Y_n}\right) \right\}$$

$$b^* = 200 * \left\{ f\left(\frac{Y}{Y_n}\right) - f\left(\frac{Z}{Z_n}\right) \right\}$$

In formula (3), Xn, Yn, and Zn represent X, Y, and Z values of a white color point.

$$f\left(\frac{X}{X_n}\right) = \begin{cases} \left(\frac{X}{X_n}\right)^{\frac{1}{3}}, \text{ when } \frac{X}{X_n} > 0.008856 \\ 7.787\left(\frac{X}{X_n}\right) + \frac{16}{116}, \text{ when } \frac{X}{X_n} \leq 0.008856 \end{cases}$$

$$f\left(\frac{Y}{Y_n}\right) = \begin{cases} \left(\frac{Y}{Y_n}\right)^{\frac{1}{3}}, \text{ when } \frac{Y}{Y_n} > 0.008856 \\ 7.787\left(\frac{Y}{Y_n}\right) + \frac{16}{116}, \text{ when } \frac{Y}{Y_n} \leq 0.008856 \end{cases}$$

$$f\left(\frac{Z}{Z_n}\right) = \begin{cases} \left(\frac{Z}{Z_n}\right)^{\frac{1}{3}}, \text{ when } \frac{Z}{Z_n} > 0.008856 \\ 7.787\left(\frac{Z}{Z_n}\right) + \frac{16}{116}, \text{ when } \frac{Z}{Z_n} \leq 0.008856 \end{cases}$$

However, image display/output devices have respective particular color reproduction ranges (i.e., different color gamuts). Thus, some reproducible colors in a specific device may not be reproduced by another device.

Hence, a conventional color matching system performs color gamut mapping processing that can replace the colors that cannot be reproduced by an object device (i.e., out-of-gamut colors) with reproducible colors (i.e., in-gamut colors).

As discussed in Japanese Patent Application Laid-Open No. 2003-283846, human eyes are sensitive to a change in an achromatic color compared to a change in a chromatic color. Thus, a general color gamut mapping system performs processing for greatly compressing the color saturation in a chromatic color region (i.e., high color saturation region) while maintaining the color saturation in an achromatic color region (i.e., low color saturation region).

As discussed in Japanese Patent Application Laid-Open No. 2005-318478, image output devices can reproduce colors of an image using various physical characteristics. However, the reproduced colors tend to fluctuate due to environmental changes (e.g., temperature, moisture, etc.). Calibration technique enables correcting color fluctuations (color deviations), if caused by environmental changes, with reference to target characteristics determined in the color design of a device. Thus, the calibration technique can realize stable color reproduction.

However, even after the color stabilization accuracy is improved with the calibration technique, errors may arise due to the difficulty in completely realizing the target characteristics. Furthermore, fluctuations in an image output device may occur in both chromatic colors and achromatic colors. If an output color fluctuates in a low color saturation region, human eyes may recognize a reproduced color having a color saturation higher than the target color saturation as color fluctuation. Human eyes are sensitive to a fluctuation in the low color saturation region compared to that in the high color saturation region.

SUMMARY OF THE INVENTION

Exemplary embodiments of the present invention are directed to a technique capable of realizing color reproduction that can reduce color deviations even if an image output device generates color fluctuations.

According to an aspect of the present invention, a color processing apparatus includes an acquiring unit configured to acquire color conversion data corresponding to an image output device, a color stabilization accuracy calculating unit configured to calculate a color stabilization accuracy of the image output device, and a correcting unit configured to correct the color conversion data according to the color stabilization accuracy. The correcting unit is configured to correct the color conversion data such that an output color saturation in a low color saturation region becomes lower when the color stabilization accuracy is low than when the color stabilization accuracy is high.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments and features of the invention and, together with the description, serve to explain principles of the invention.

DETAILED DESCRIPTION OF THE EMBODIMENTS

The following description of exemplary embodiments is illustrative in nature and is in no way intended to limit the invention, its application, or uses. Processes, techniques, apparatus, and systems as known by one of ordinary skill in the art are intended to be part of the enabling description where appropriate. It is noted that throughout the specification, similar reference numerals and letters refer to similar items in the following figures, and thus once an item is described in one figure, it may not be discussed for following figures. Exemplary embodiments will be described in detail below with reference to the drawings.

Figure 1:
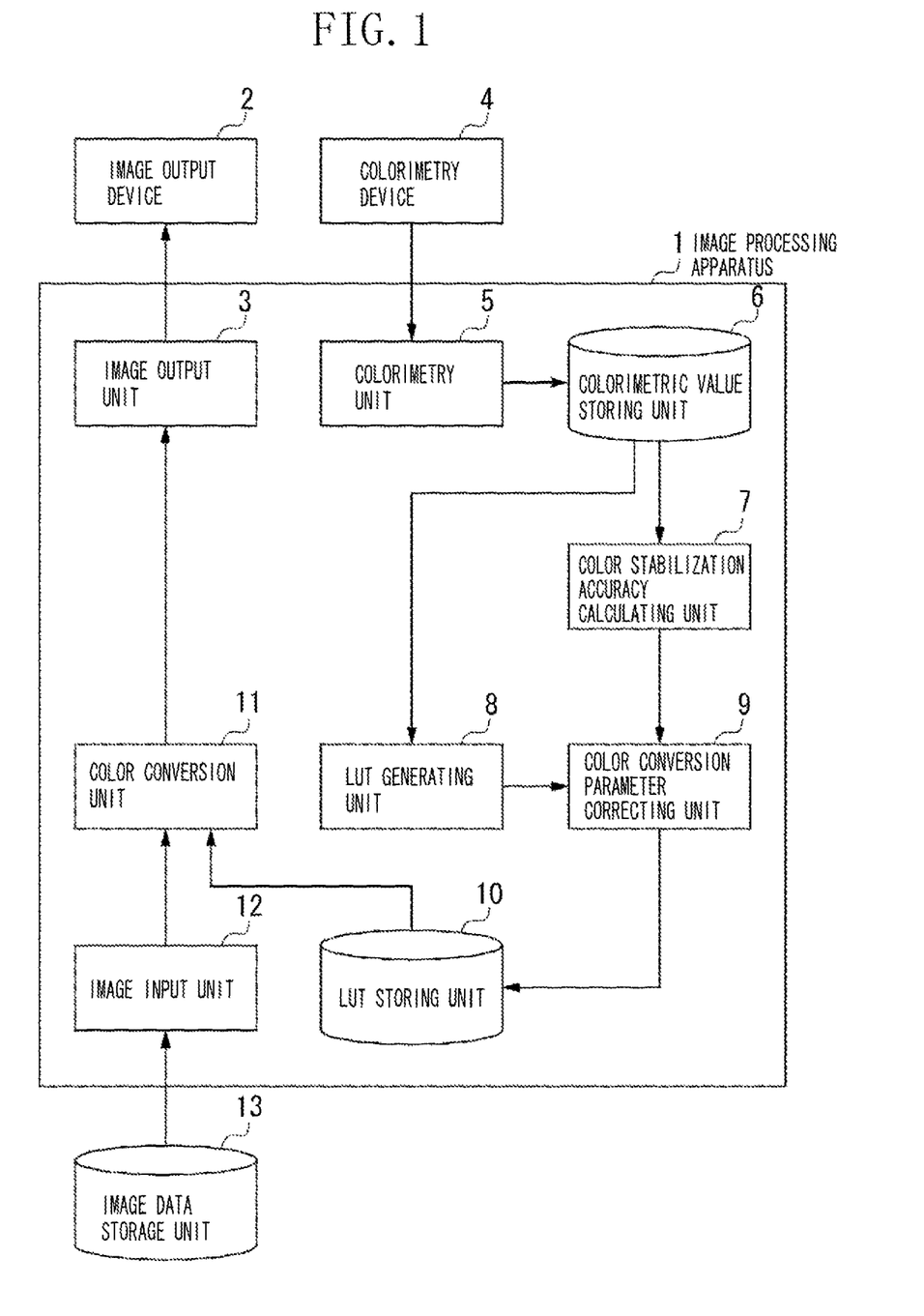
FIG. 1 is a block diagram illustrating an image processing apparatus according to an exemplary embodiment of the present invention.

FIG. 1 is a block diagram illustrating an image processing apparatus 1 according to an exemplary embodiment of the present invention. The image processing apparatus 1 is connected to an image output device 2, a colorimetry device 4, and an image data storage unit 13. The image processing apparatus 1 includes an image output unit 3, a colorimetry unit 5, a colorimetric value storing unit 6, a color stabilization accuracy calculating unit 7, a look-up table (LUT) generating unit 8, a color conversion parameter correcting unit 9, an LUT storing unit 10, a color conversion unit 11, and an image input unit 12.

The image output device 2 is, for example, a cathode ray tube (CRT) display, a liquid crystal display (LCD), an inkjet printer, or a laser printer, which can display or print an image. The image output unit 3 is configured to output image data to the image output device 2. The colorimetry device 4 is, for example, a spectral colorimeter that can measure a color chart. The colorimetry unit 5 is configured to obtain colorimetric data of a chart measured by the colorimetry device 4.

The colorimetric value storing unit 6 is configured to store the colorimetric data obtained by the colorimetry unit 5. The color stabilization accuracy calculating unit 7 is configured to calculate a color stabilization accuracy of the image output device 2 based on the colorimetric data stored in the colorimetric value storing unit 6. The LUT generating unit 8 is configured to generate a look-up table (LUT) based on the colorimetric data stored in the colorimetric value storing unit 6.

The color conversion parameter correcting unit 9 is configured to correct the LUT generated by the LUT generating unit 8 according to the color stabilization accuracy calculated by the color stabilization accuracy calculating unit 7. The LUT storing unit 10 is configured to store the corrected LUT output from the color conversion parameter correcting unit 9. The LUT storing unit 10 also stores color chart data for a color gamut measurement chart and a color stabilization accuracy measurement chart that can be output to the image output device 2. Furthermore, the LUT storing unit 10 stores input color gamut data which can be used when an LUT is generated.

The image input unit 12 is configured to read image data from the image data storage unit 13. The color conversion unit 11 is configured to perform color conversion processing on the input data read by the image input unit 12 with reference to the LUT stored in the LUT storing unit 10. The image data storage unit 13 is, for example, a hard disk or a compact disc-read only memory (CD-ROM), which can store image data.

Figure 2:
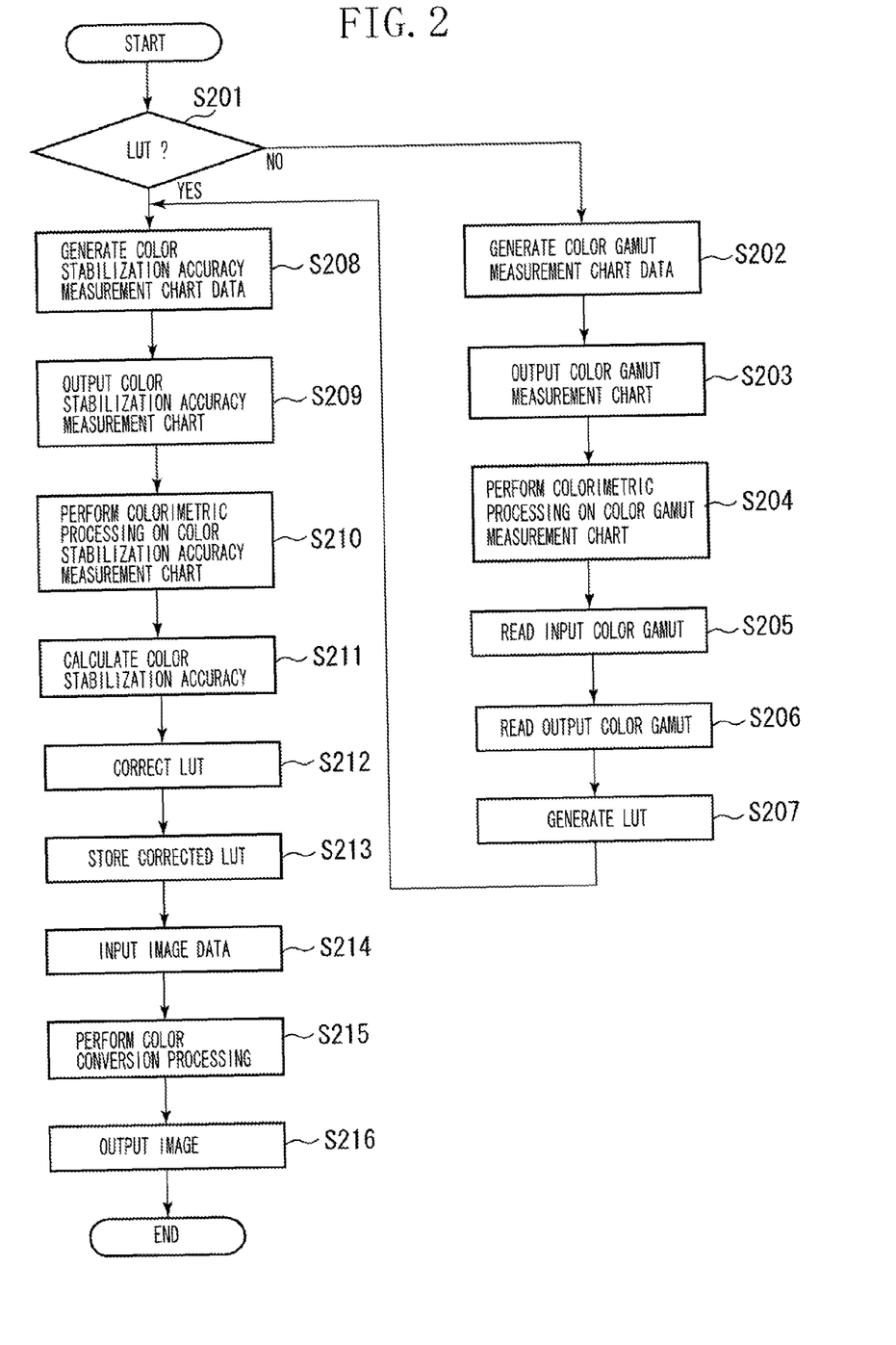
FIG. 2 is a flowchart illustrating an operation of the image processing apparatus according to an exemplary embodiment of the present invention.

FIG. 2 is a flowchart illustrating exemplary image input/output processing performed by the image processing apparatus 1.

In step S201, the image processing apparatus 1 determines whether the LUT storing unit 10 stores an LUT. If the LUT storing unit 10 stores an LUT (YES in step S201), the processing flow proceeds to step S208. If the LUT storing unit 10 does not store an LUT (NO in step S201), the processing flow proceeds to step S202.

In step S202, the image output unit 3 generates color gamut measurement chart data based on color chart data stored in the LUT storing unit 10 and outputs the generated color gamut measurement chart data to the image output device 2.

In step S203, the image output device 2 generates a color gamut measurement chart based on the color gamut measurement chart data generated in step S202 and outputs the generated color gamut measurement chart.

In step S204, the colorimetry unit 5 obtains colorimetric data from the colorimetry device 4 that performs colorimetric processing on the color gamut measurement chart output in step S203. The colorimetric value storing unit 6 stores the obtained colorimetric data.

In step S205, the LUT generating unit 8 reads input color gamut from the LUT storing unit 10.

In step S206, the LUT generating unit 8 reads the colorimetric values stored in the colorimetric value storing unit 6, which represent the color gamut of the image output device 2.

In step S207, the LUT generating unit 8 generates an LUT (i.e., a color conversion table) based on the input color gamut read in step S205 and the output color gamut read in step S206.

In step S208, the image output unit 3 generates color stabilization accuracy measurement chart data based on the color chart data stored in the LUT storing unit 10 and outputs the generated color stabilization accuracy measurement chart data to the image output device 2.

In step S209, the image output device 2 generates a color stabilization accuracy measurement chart based on the color stabilization accuracy measurement chart data generated in step S208 and outputs the generated color stabilization accuracy measurement chart.

In step S210, the colorimetric unit 5 obtains colorimetric data from the colorimetric device 4 that performs colorimetric processing on the color stabilization accuracy measurement chart output in step S209. The colorimetric value storing unit 6 stores the obtained colorimetric data.

In step S211, the color stabilization accuracy calculating unit 7 calculates a color stabilization accuracy of the image output device 2 based on the colorimetric data of the color stabilization accuracy measurement chart. The color stabilization accuracy is, for example, an average of standard deviations of the colorimetric data about the same patch which are obtained from all patches.

In step S212, the color conversion parameter correcting unit 9 corrects the LUT generated in step S207 according to the color stabilization accuracy calculated in step S211.

In step S213, the LUT storing unit 10 stores the LUT corrected in step S212.

In step S214, the image input unit 12 reads image data stored in the image data storage unit 13.

In step S215, the color conversion unit 11 performs color conversion processing on the image data read in step S214 with reference to the corrected LUT stored in the LUT storing unit 10.

In step S216, the image output unit 3 receives image data subjected to the color conversion processing in step S215 from the color conversion unit 11 and outputs the received image data to the image output device 2. The image output device 2 outputs an image according to the input image data.

Figure 3:
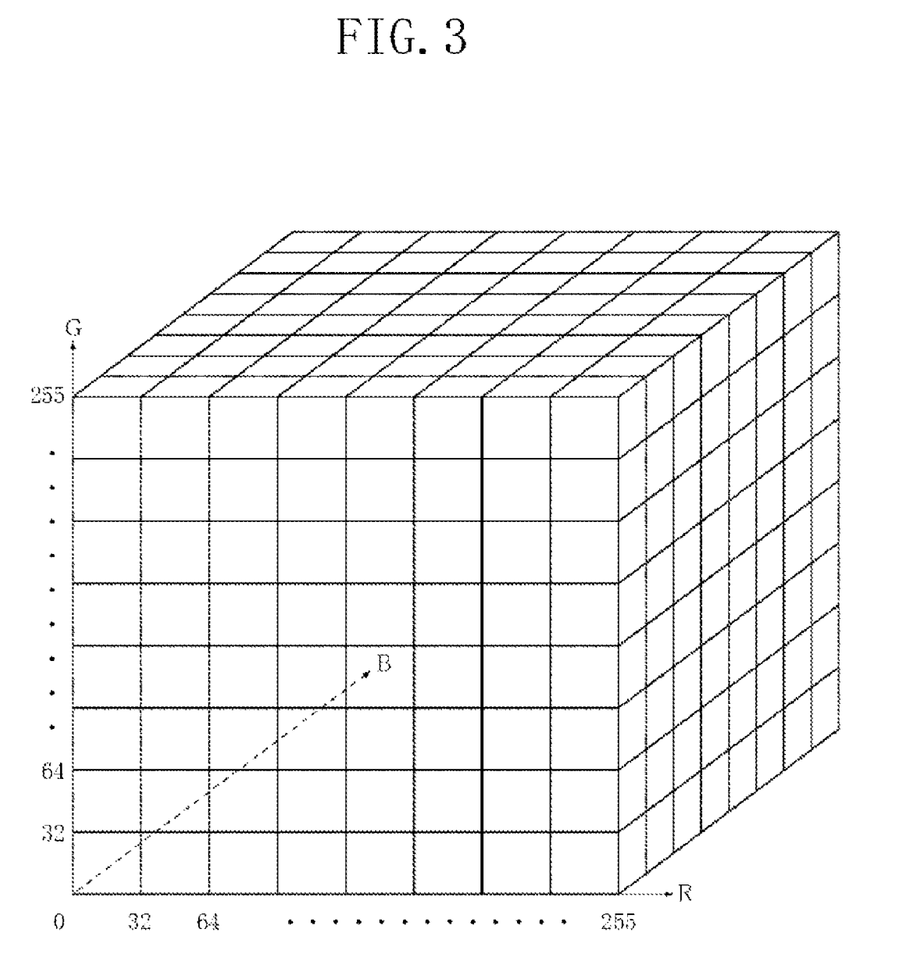
FIG. 3 illustrates an equally-spaced grid in an RGB space.
Figure 4:
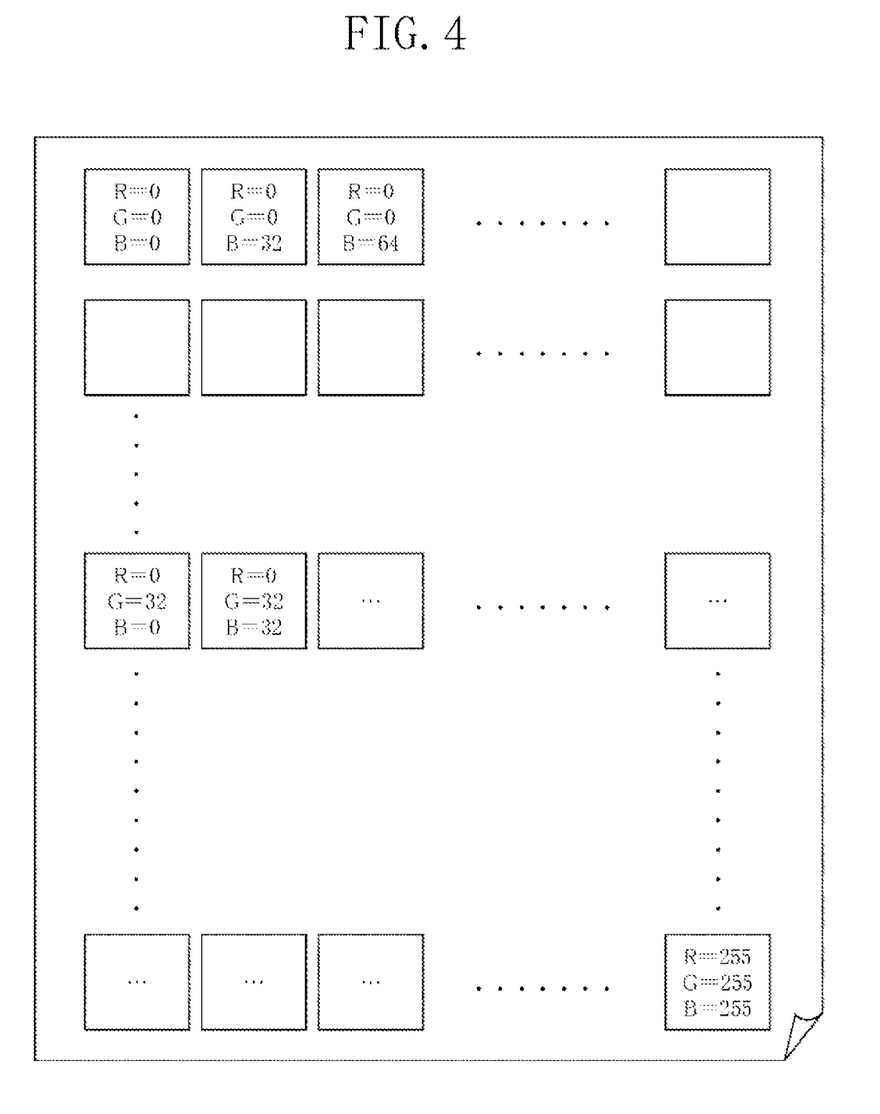
FIG. 4 illustrates an exemplary color gamut measurement chart.

FIG. 4 illustrates an exemplary color gamut measurement chart output in step S203, including a plurality of patch corresponding to RGB values corresponding to the equally-spaced grid of an RGB space illustrated in FIG. 3.

Figure 5:
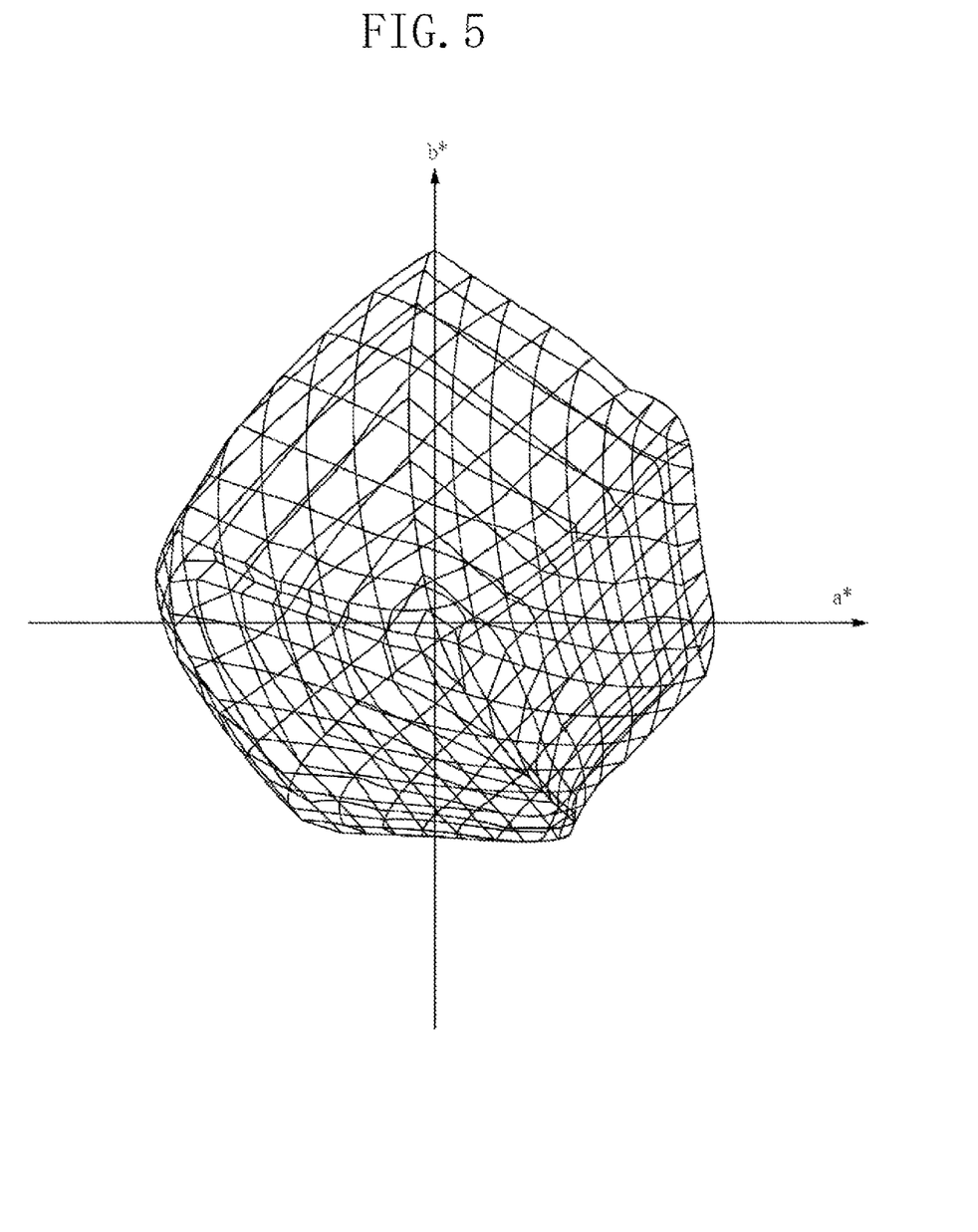
FIG. 5 illustrates an exemplary color gamut of an image output device.

FIG. 5 illustrates an exemplary color gamut of an image output device that can be obtained by converting colorimetric data of the color gamut measurement chart output from the image output device 2 into a device-independent color space (e.g., Lab values) and analyzing the converted data.

When the color signals of a device are managed in the RGB space illustrated in FIG. 3, colorimetric values of respective patches of RGB values positioned on six surfaces of an RGB cubic become boundary values in the color gamut illustrated in FIG. 5.

Figure 6:
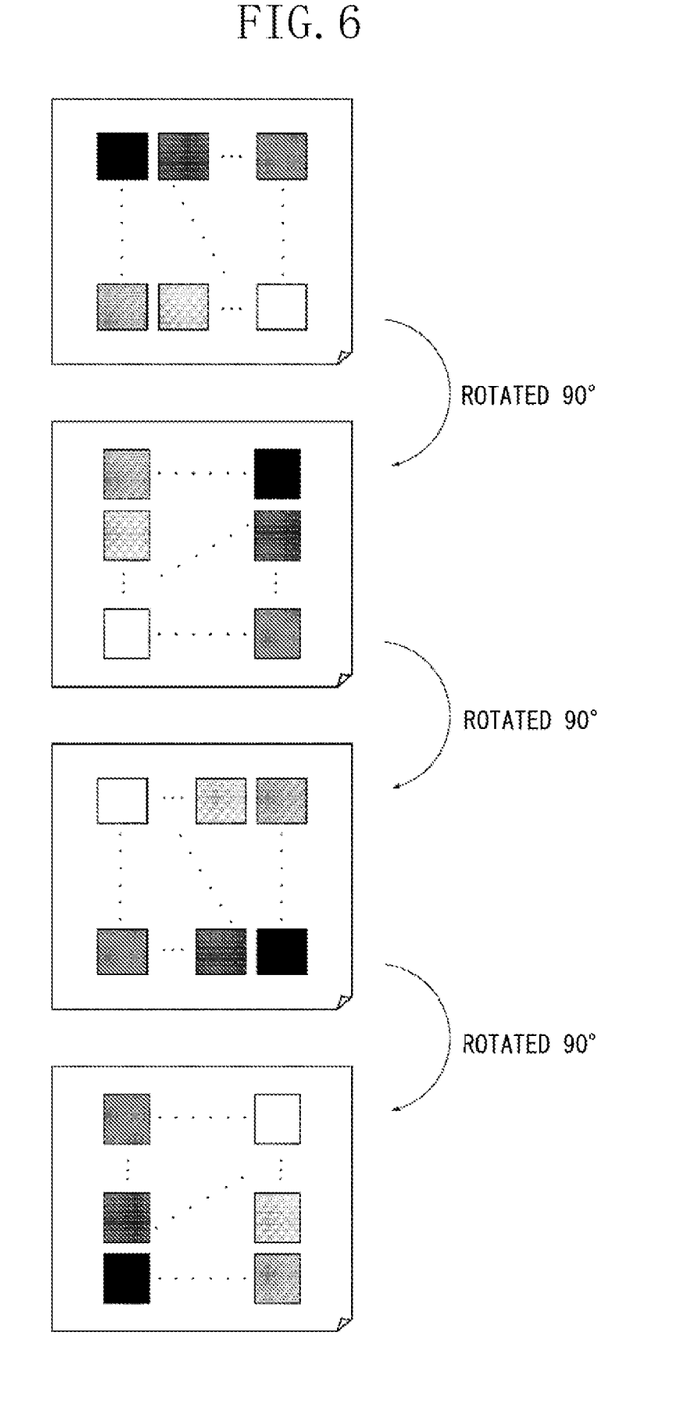
FIG. 6 illustrates an exemplary color stabilization accuracy measurement chart.

FIG. 6 illustrates an exemplary color stabilization accuracy measurement chart output in step S209, which includes four color gamut measurement charts which are rotated 90° with respect to one another.

Figure 7:
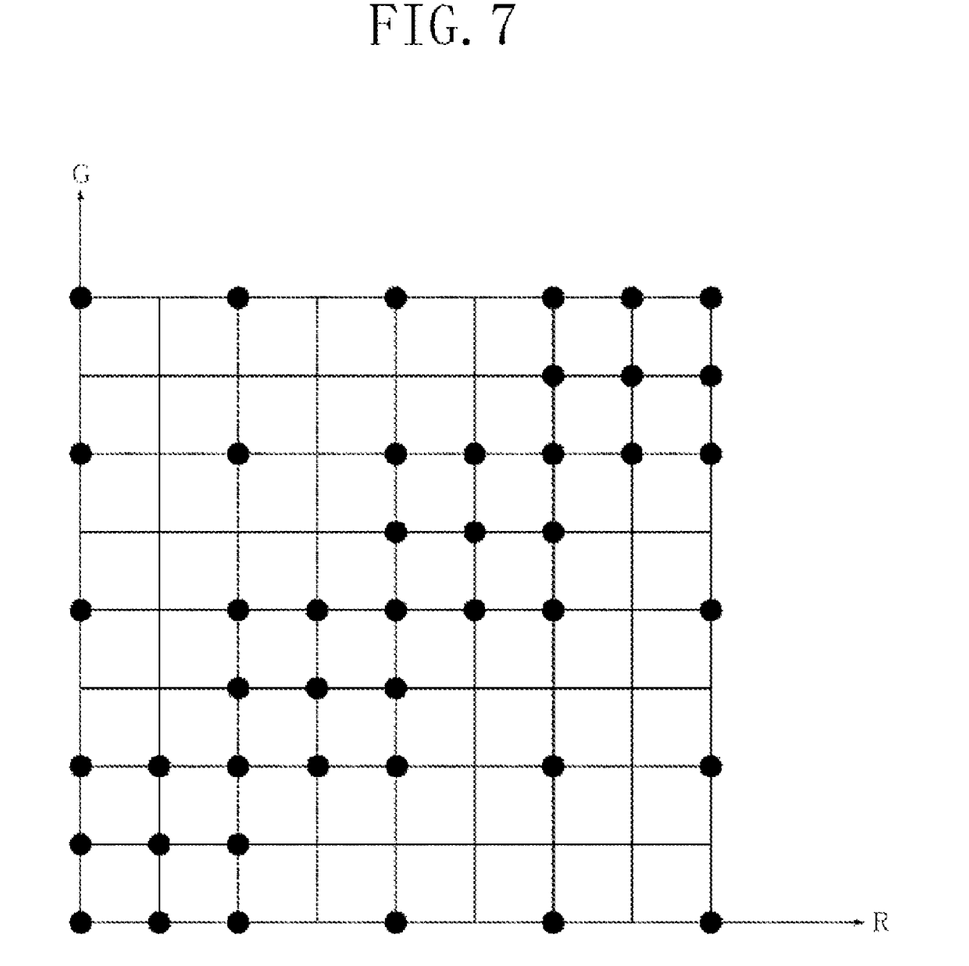
FIG. 7 illustrates an exemplary RGB grid of a color stabilization accuracy measurement chart.

Alternatively, the color stabilization accuracy measurement chart can include four sheets, which are rotated 90° with respect to one another, of a color chart converted from RGB grid data illustrated in FIG. 7 according to which the grid interval (i.e., an interval between black circles in FIG. 7) is narrowed only in an achromatic color region.

Furthermore, the color stabilization accuracy measurement chart can be two color charts which are in an inversed relationship in the right-and-left direction or in the up-and-down direction, or can be two or more color charts which are different in the order of patches on a single color chart.

Namely, any type of chart can be used if a fluctuation in the colorimetric value can be calculated when the image output device 2 outputs the chart according to the same data a plurality of times.

The LUT correction in step S212 is described below in detail. An exemplary color gamut mapping method includes suppressing the color saturation compression in a low color saturation portion while increasing the color saturation compression in a high color saturation portion. However, human eyes are sensitive to a fluctuation in a low color saturation region compared to that in a high color saturation region.

If an erroneously output achromatic color has high color saturation, human eyes may recognize color fluctuation as an undesirable result of the color reproduction. Hence, when the color stabilization accuracy is low, an exemplary embodiment increases a color saturation compression rate to reduce the color fluctuation in a low color saturation region.

More specifically, an exemplary embodiment uses the following formula (4) to calculate $C_{out}$ (color saturation having been corrected) based on $C_{in}$ (color saturation having been subjected to the color gamut mapping) and $\sigma$ (color stabilization accuracy). Namely, an exemplary embodiment corrects the color saturation ($C_{in}$) of an output value of the LUT according to formula (4).

$$C_{out} = \frac{C_{in}}{\left(1 + \frac{\sigma}{C_{in}}\right)} \tag{4}$$

In formula (4), $C_{out}$ represents an output color saturation, $C_{in}$ represents an input color saturation, and $\sigma$ represents a color stabilization accuracy.

Figure 8:
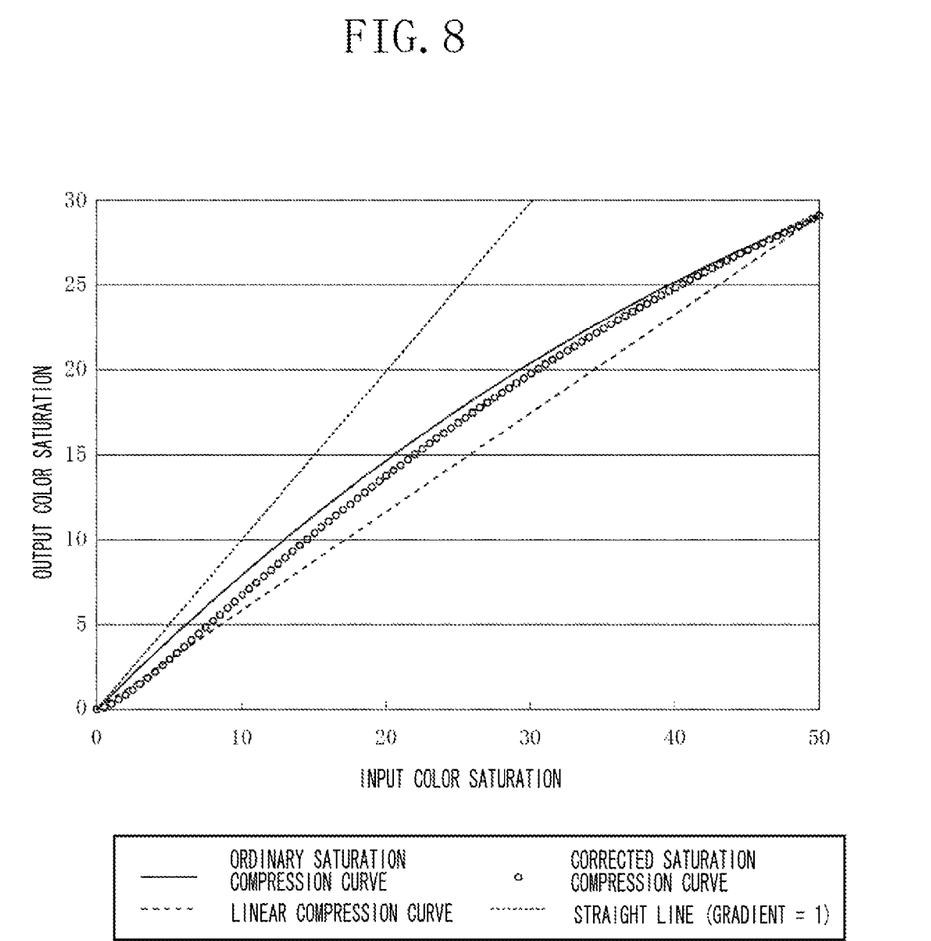
FIG. 8 illustrates an exemplary color saturation compression curve reflecting a color stabilization accuracy.

FIG. 8 illustrates an exemplary color saturation conversion curve compressed according to an ordinary color gamut mapping method and an exemplary corrected color saturation conversion curve. The ordinary color saturation conversion curve is adjacent to a straight line (gradient=1) in the low color saturation region. Namely, the input color saturation can be maintained in the color reproduction.

On the other hand, according to the corrected color saturation conversion curve, the reproduced color in the low color saturation region has a low color saturation compared to the input color saturation.

Figure 9:
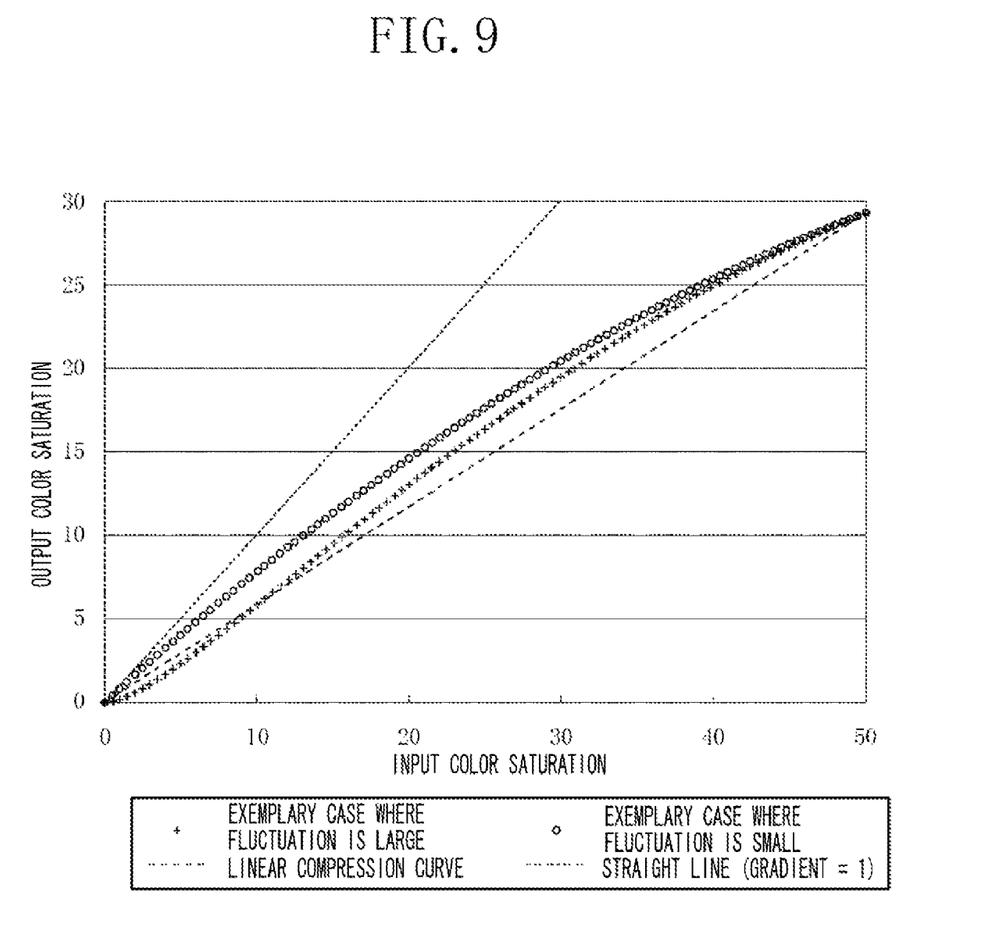
FIG. 9 illustrates an exemplary color saturation compression curve that varies depending on the color stabilization accuracy.

FIG. 9 illustrates an exemplary change in the correction result according to the color stabilization accuracy. The color saturation compression rate in the low color saturation region is larger when the fluctuation amount is large than when the fluctuation amount is small. Thus, the system can reduce the color fluctuation.

As described above, when the color stabilization accuracy is low, i.e., when the fluctuation amount is large, an exemplary embodiment corrects the color saturation in the low color saturation region to have low color saturation values compared to the ordinary level. Thus, an exemplary embodiment can reduce the color fluctuation that may be generated in an output image. On the other hand, when the color stabilization accuracy is high, an exemplary embodiment maintains the color saturation in the low color saturation region so that a high-quality output image can be reproduced.

As described above, according to the first exemplary embodiment, in a color gamut mapping from the color gamut of an image input device to the color gamut of an image output device, the system controls the color saturation according to the color stabilization accuracy of the image output device (e.g., a printer). Thus, the system can prevent a device from generating a large fluctuation in the low color saturation region.

Figure 10:
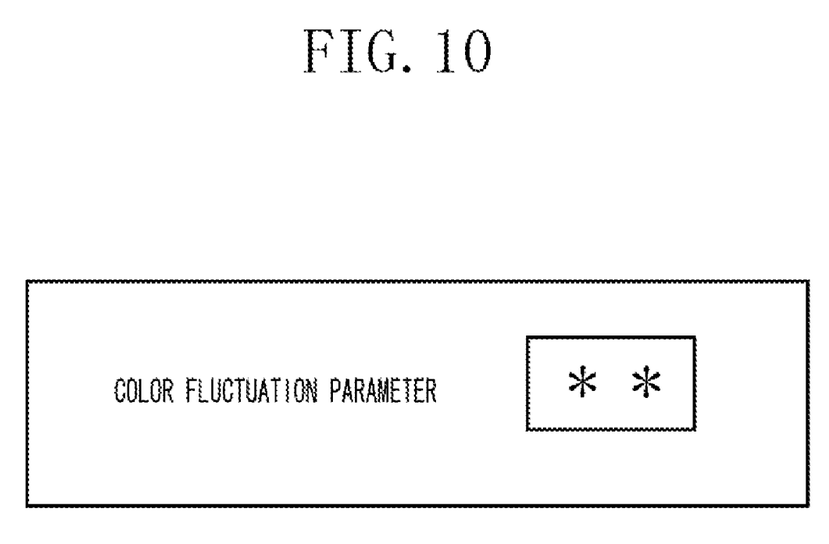
FIG. 10 illustrates an exemplary user interface that allows a user to set the color stabilization accuracy.

In the above-described exemplary embodiment, the color stabilization accuracy calculating unit 7 calculates the color stabilization accuracy of the image output device 2 based on colorimetric data stored in the colorimetric value storing unit 6. FIG. 10 illustrates an exemplary user interface that allows a user to set (instruct) the color stabilization accuracy.

Furthermore, the system can combine a user instruction input via the user interface with the color stabilization accuracy calculated by the color stabilization accuracy calculating unit 7. The combined information can be used to control the color stabilization accuracy σ of the above-mentioned formula (4). In the above-described exemplary embodiment, the image processing apparatus 1 has a function of generating an LUT. However, the image processing apparatus 1 can input an LUT for an object to be corrected from an external device.

Furthermore, in the above-described exemplary embodiment, the device-independent color space is not limited to a CIELab space and can be a Color Appearance Model 2002 (CIECAM02) JCH space or any other type of device-independent color space.

Furthermore, in the above-described exemplary embodiment, the color chart data is not limited to RGB data. In the above-described exemplary embodiment, an exemplary image output device is a printer (RGB printer) including a printer driver configured to convert the input RGB data into ink discharge amounts of three or more color inks (e.g., cyan, magenta, yellow, and black).

If the image output device is a CMYK printer configured to directly input ink discharge amounts of CMYK inks, the above-described color chart data can be generated in a CMYK space. The above-described exemplary embodiment can use any type of color space if it can produce a color chart usable for measurement of a color gamut or a color stabilization accuracy of an image output device.

The present invention can be applied to a system including two or more devices (e.g., a host computer, an interface device, a reader, and a printer) or a single apparatus (e.g., a copying machine, a facsimile apparatus, or the like).

Furthermore, software program code for realizing the functions of the above-described exemplary embodiments can be supplied to a system or an apparatus including various devices. A computer (or a central processing unit (CPU) or a micro-processing unit (MPU)) in the system or the apparatus can execute the program code to operate the devices to realize the functions of the above-described exemplary embodiments. Accordingly, the present invention encompasses the program code installable on a computer when the functions or processes of the exemplary embodiments can be realized by the computer.

In this case, the program code itself can realize the functions of the exemplary embodiments. The equivalents of programs can be used if they possess comparable functions. Furthermore, the present invention encompasses supplying program code to a computer with a storage (or recording) medium storing the program code. In this case, the type of program can be any one of object code, interpreter program, and OS script data. A storage medium supplying the program code can be selected from any one of a floppy disk, a hard disk, an optical disk, a magneto-optical (MO) disk, a CD-ROM, a CD-recordable (CD-R), a CD-rewritable (CD-RW), a magnetic tape, a nonvolatile memory card, a ROM, and a digital versatile disc (DVD) (DVD-ROM, DVD-R).

Moreover, an operating system (OS) or other application software running on a computer can execute part or all of actual processing based on instructions of the program code. Additionally, the program code read out of a storage medium can be written into a memory of a function expansion board equipped in a computer or into a memory of a function expansion unit connected to the computer. In this case, based on an instruction of the program code, a CPU provided on the function expansion board or the function expansion unit can execute part or all of the processing so that the functions of the above-described exemplary embodiments can be realized.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-341398 filed Dec. 19, 2006, which is hereby incorporated by reference herein in its entirety.

What is claimed is:

1. A color processing apparatus comprising:
    an acquiring unit configured to acquire color conversion data corresponding to an image output device;
    a color stabilization accuracy setting unit configured to set a color stabilization accuracy of the image output device; and
    a correcting unit configured to correct the color conversion data according to the color stabilization accuracy, the correcting unit configured to correct the color conversion data such that an output color saturation in a low color saturation region becomes lower when the color stabilization accuracy is low by increasing a color saturation compression rate in the low color saturation region when the color stabilization accuracy is low,
    wherein the color conversion data is used to perform color conversion processing for compressing an input color gamut into a color gamut of the image output device.

2. The color processing apparatus according to claim 1, wherein the correcting unit increases the color saturation compression rate as the color stabilization accuracy is lower, and increases the color saturation compression rate as the color saturation of an input color is lower.

3. The color processing apparatus according to claim 1, wherein the color conversion data includes a look-up table.

4. The color processing apparatus according to claim 1, wherein the color stabilization accuracy calculating unit calculates the color stabilization accuracy based on a standard deviation of colorimetric data of a plurality of similar patches output from the image output device.

5. A method comprising:
    using a processor to perform:
    acquiring color conversion data corresponding to an image output device;
    calculating a color stabilization accuracy of the image output device; and
    correcting the color conversion data according to the color stabilization accuracy such that an output color saturation in a low color saturation region becomes lower when the color stabilization accuracy is low by increasing a color saturation compression rate in the low color saturation region when the color stabilization accuracy is low, wherein the color conversion data is used to perform color conversion processing for compressing an input color gamut into a color gamut of the image output device.

6. A non-transitory computer-readable storage device storing instructions which, when executed by an apparatus, cause the apparatus to perform the method according to claim 5.

* * * * *